(12) United States Patent
Liang

(10) Patent No.: US 10,735,908 B2
(45) Date of Patent: Aug. 4, 2020

(54) SYSTEMS AND APPARATUSES FOR DETECTING UNMANNED AERIAL VEHICLE

(71) Applicant: NOKIA TECHNOLOGIES OY, Espoo (FI)

(72) Inventor: Yuyang Liang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/496,105

(22) PCT Filed: Mar. 22, 2017

(86) PCT No.: PCT/CN2017/077719
§ 371 (c)(1),
(2) Date: Sep. 20, 2019

(87) PCT Pub. No.: WO2018/170797
PCT Pub. Date: Sep. 27, 2018

(65) Prior Publication Data
US 2020/0100065 A1    Mar. 26, 2020

(51) Int. Cl.
*H04W 24/00* (2009.01)
*H04W 4/029* (2018.01)
(Continued)

(52) U.S. Cl.
CPC .......... *H04W 4/029* (2018.02); *G08B 21/182* (2013.01); *G10L 25/51* (2013.01); *H04B 17/318* (2015.01);
(Continued)

(58) Field of Classification Search
USPC .......................... 455/456.1, 550.1, 431, 11.1
See application file for complete search history.

(56) References Cited

U.S. PATENT DOCUMENTS 7,782,256 B2    8/2010  Smith
9,588,516 B1 *  3/2017  Gurel .................. G05D 1/0033
(Continued)

FOREIGN PATENT DOCUMENTS

CN    105511491 A    4/2016
CN    105511492 A    4/2016
(Continued)

OTHER PUBLICATIONS

International Search Report and Written Opinion for Application No. PCT/CN2017/077719 dated Dec. 6, 2017, 6 pages.
(Continued)

*Primary Examiner* — Danh C Le
(74) *Attorney, Agent, or Firm* — Alston & Bird LLP

(57) ABSTRACT

Apparatuses, methods, and computer program products disclosed herein provide improved unmanned aerial vehicle (UAV) detection. A method may include receiving data including wireless signal strength collected by one or more devices, monitoring the data including the wireless signal strength to determine if the wireless signal strength of a wireless signal source increases over time in a manner to satisfy a predefined threshold in order to be indicative of a UAV, determining a trajectory of the UAV based upon the data including the wireless signal strength, and generating an alert based on, at least, the trajectory of the UAV as indicated by the data including the wireless signal strength.

21 Claims, 11 Drawing Sheets

(51) Int. Cl.
  *H04B 17/318*  (2015.01)
  *G10L 25/51*  (2013.01)
  *G08B 21/18*  (2006.01)
  *H04W 8/22*  (2009.01)
  *H04W 84/06*  (2009.01)
  *G06N 20/00*  (2019.01)

(52) U.S. Cl.
  CPC .............. *H04W 8/22* (2013.01); *G06N 20/00* (2019.01); *H04W 84/06* (2013.01)

(56) References Cited

U.S. PATENT DOCUMENTS

| | | | | |
|---|---|---|---|---|
| 10,517,062 | B2* | 12/2019 | Chae | H04W 4/026 |
| 2012/0277988 | A1* | 11/2012 | Sosulin | G01S 19/22 |
| | | | | 701/301 |
| 2013/0165047 | A1* | 6/2013 | Suzuki | H04W 12/06 |
| | | | | 455/41.2 |
| 2013/0189975 | A1* | 7/2013 | Wyler | H04W 36/14 |
| | | | | 455/427 |
| 2015/0004974 | A1* | 1/2015 | Karimi-Cherkandi | |
| | | | | H04W 48/16 |
| | | | | 455/435.2 |
| 2015/0145643 | A1 | 5/2015 | Fadell et al. | |
| 2015/0236778 | A1* | 8/2015 | Jalali | H04W 84/06 |
| | | | | 370/316 |
| 2015/0254988 | A1 | 9/2015 | Wang et al. | |
| 2015/0302858 | A1 | 10/2015 | Hearing et al. | |
| 2016/0035224 | A1 | 2/2016 | Yang et al. | |
| 2016/0080107 | A1* | 3/2016 | Girouard | A61B 5/0004 |
| | | | | 600/546 |
| 2017/0255206 | A1* | 9/2017 | Chen | H04B 17/318 |
| 2018/0102667 | A1* | 4/2018 | Choi | H04B 5/0031 |
| 2019/0313317 | A1* | 10/2019 | Murphy | G06N 20/00 |
| 2020/0043348 | A1* | 2/2020 | Ghosh | H04W 4/42 |

FOREIGN PATENT DOCUMENTS

| | | |
|---|---|---|
| CN | 106114880 A | 11/2016 |
| CN | 106461396 A | 2/2017 |

OTHER PUBLICATIONS

DeTect Announces Drone Detection App for Android Smartphones and Tablets | Unmanned Systems Technology [online] [retrieved Jan. 10, 2017]. Retrieved via the Internet: http://www.unmannedsystemstechnology.com/2016/06/detect-announces-drone-detection-app-for-android-smartphones-and-tablets/ (dated Jun. 24, 2016) 12 pages.

Drones: Detect, identify, intercept and hijack [online] [retrieved Jan. 10, 2017]. Retrieved via the Internet: https://www.negroup.trust/uk/about-us/newsroom-and-events/blogs/2015/december/drones-detect-identify-intercept-and-hijack/ (dated Dec. 2, 2015) 10 pages.

Nasa and Verizon plan to monitor US drone network from phone towers | Technology | The Guardian [online] [retrieved Jan. 10, 2017]. Retrieved via the Internet: https://www.theguardian.com/technology/2015/jun/03/verizon-nasa-drones-cellphone-towers (dated Jun. 3, 2015) 3 pages.

Scale it to your needs, Advanced drone detection and warning device [online] [retrieved Jan. 20, 2017]. Retrieved via the Internet: http://www.dedrone.com/en/dronetracker/drone-detection-hardware (dated Dec. 28, 2016), 14 pages.

Dedrone, Technical Specification DroneTracker Multi Sensor, Product List, Total Airspace Security (dated Sep. 26, 2016) 6 pages.

Drone Near White House Lockdown—Robotics Business Review [online] [retrieved Nov. 6, 2019]. Retrieved via the Internet: https://www.roboticsbusinessreview.com/rbr/drone_near_white_house_causes_lockdown/2/. (dated May 14, 2015) 4 pages.

Hauzenberger, L. et al., *Drone Detection Using Audio Analysis*, Master's Thesis, Department of Electrical and Information Technology, Lund University (Jun. 2015) 50 pages.

Intaratep, N. etal., *Experimental Study of Quadcopter Acoustics and Performance at Static Thrust Conditions*, American Institute of Aeronautics and Astronautics, Aeroacoustics Conference (May-Jun. 2016) 14 pages.

Koehler, J., *Tiny Device will Detect Domestic Drones*, News (www.USNews.com/News) (dated May 1, 2013) 10 pages.

Massey, K. et al., *Noise Measurements of Tactical UAVs*, American Institute of Aeronautics and Astronautics, 16th AIAA/CEAS Aeroacoustics Conference (2010) 16 pages.

Nguyen, P. et al., *Investigating Cost-Effective RF-Based Detection of Drones*, DroNet'16 (Jun. 26, 2016) 17-22.

Sinibaldi, G. et al., *Experimental Analysis on the Noise of Propellers for Small UAV*, Applied Acoustics 74 (2013) 79-88.

* cited by examiner

SYSTEMS AND APPARATUSES FOR DETECTING UNMANNED AERIAL VEHICLE

CROSS-REFERENCE TO RELATED APPLICATIONS

The present application is a national phase entry of International Application No. PCT/CN2017/077719, filed Mar. 22, 2017, the contents of which are incorporated herein by reference in its entirety.

TECHNOLOGICAL FIELD

An example embodiment of the present invention relates to a method, apparatus, and computer program product for detecting an unmanned aerial vehicle (UAV) and alerting a user when the UAV is in close proximity of the user's property.

BACKGROUND

An unmanned aerial vehicle (UAV) or "drone" or unmanned aircraft system (UAS) is an aerial vehicle designed to be used without a human pilot onboard and controlled remotely or flown autonomously through software flight plans. UAVs may fly everywhere, including over private or public properties. UAVs have been used for various purposes including search and rescue, traffic monitoring, weather forecasting, crowd monitoring, agriculture management, commercial package deliveries, aerial photography, surveillance, and the like. However, despite these benefits, aerial surveillance by UAVs raises significant privacy issues. Due to the heights at which UAVs can fly and their sometimes small structure, they are often beyond the range of sight for most people, which can give a rise to disconcerting feeling that one may be monitored and information may be gathered by a UAV without one's knowledge. For example, one such UAV may be hovering at an apartment window and may anonymously perform video surveillance to gather information about an individual's private life.

BRIEF SUMMARY

In example embodiments, various apparatuses, methods, and computer program products are provided that facilitate improved UAV detection. An example method includes receiving data including wireless signal strength collected by one or more devices, monitoring the data including the wireless signal strength to determine if the wireless signal strength of a wireless signal source increases over time in a manner to satisfy a predefined threshold in order to be indicative of a UAV, determining a trajectory of the UAV based upon the data including the wireless signal strength, and generating an alert based on, at least, the trajectory of the UAV as indicated by the data including the wireless signal strength.

In some example embodiments, the method may include receiving an audio noise signal, determining whether the audio noise signal is associated with the UAV based on signal strength, and generating another alert in an instance in which the audio noise signal is associated with the UAV.

In some example embodiments, determining the audio signal is associated with the UAV may be done in one of several ways. For instance, an example method comprises analyzing an audio noise strength of the received audio noise signal and identifying the UAV in an instance in which the audio noise signal satisfies a predetermined threshold.

In some example embodiments, the method may include determining an estimated time of arrival of the UAV based on the data including the wireless signal strength, wherein determining the estimated arrival time further comprises calculating the estimated arrival time based upon the trajectory and timestamp information associated with the data collected by one or more devices.

In yet another example embodiment, the method may include maintaining an address dictionary of address of a plurality of wireless sources and comparing address information from the data collected to the addresses maintained by the address dictionary to facilitate a determination of the UAV, wherein the data includes position data that is based on a position of the one or more devices of a crowdsourcing network.

Although described using an example method above, an apparatus is also contemplated herein that includes at least one processor and at least one memory including computer program code with the at least one memory coupled to the at least one processor, and the computer program code configured to, when executed by a processor, cause the apparatus to receive data including wireless signal strength collected by one or more devices, monitor the data including the wireless signal strength to determine if the wireless signal strength of a wireless signal source increases over time in a manner to satisfy a predefined threshold in order to be indicative of an unmanned aerial vehicle (UAV), determine a trajectory of the UAV based upon the data including the wireless signal strength, and generate an alert based on, at least, the trajectory of the UAV as indicated by the data including the wireless signal strength.

In some example embodiments, the apparatus is caused to receive an audio noise signal, determine whether the audio noise signal is associated with the UAV based on signal strength, and generate another alert in an instance in which the audio noise signal is associated with the UAV.

In some example embodiments, determining the audio signal is associated with the UAV may be done in one of several ways. For instance, the apparatus is caused to analyze an audio noise strength of the received audio noise signal and identify the UAV in an instance in which the audio noise signal satisfies a predetermined threshold.

In some example embodiments, the apparatus is caused to determine an estimated time of arrival of the UAV based on the data including the wireless signal strength, wherein determining the estimated arrival time further comprises calculating the estimated arrival time based upon the trajectory and timestamp information associated with the data collected by one or more devices.

In yet another example embodiment, the apparatus may be further caused to maintain an address dictionary of address of a plurality of wireless sources and compare address information from the data collected to the addresses maintained by the address dictionary to facilitate a determination of the UAV, wherein the data includes position data that is based on a position of the one or more devices of a crowdsourcing network.

Similarly, an example computer program product is also contemplated herein. The computer program product includes a non-transitory computer readable storage medium with the non-transitory computer readable storage medium comprising instructions that, when executed by a device, configure the device to receive data including wireless signal strength collected by one or more devices, monitor the data including the wireless signal strength to determine if the wireless signal strength of a wireless signal source increases over time in a manner to satisfy a predefined threshold in order to be indicative of an unmanned aerial vehicle (UAV), determine a trajectory of the UAV based upon the data including the wireless signal strength, and generate an alert based on, at least, the trajectory of the UAV as indicated by the data including the wireless signal strength.

In some example embodiments, the computer program product is caused to receive an audio noise signal, determine whether the audio noise signal is associated with the UAV based on signal strength, and generate another alert in an instance in which the audio noise signal is associated with the UAV.

In some example embodiments, determining the audio signal is associated with the UAV may be done in one of several ways. For instance, the computer program product is caused to analyze an audio noise strength of the received audio noise signal and identify the UAV in an instance in which the audio noise signal satisfies a predetermined threshold.

In some example embodiments, the computer program product is caused to determine an estimated time of arrival of the UAV based on the data including the wireless signal strength, wherein determining the estimated arrival time further comprises calculating the estimated arrival time based upon the trajectory and timestamp information associated with the data collected by one or more devices.

In yet another example embodiment, the computer program product may be further caused to maintain an address dictionary of address of a plurality of wireless sources and compare address information from the data collected to the addresses maintained by the address dictionary to facilitate a determination of the UAV, wherein the data includes position data that is based on a position of the one or more devices of a crowdsourcing network.

In a further example embodiment, an apparatus is provided that includes means for receiving data including wireless signal strength collected by one or more devices, means for monitoring the data including the wireless signal strength to determine if the wireless signal strength of a wireless signal source increases over time in a manner to satisfy a predefined threshold in order to be indicative of a UAV, means for determining a trajectory of the UAV based upon the data including the wireless signal strength, and means for generating an alert based on, at least, the trajectory of the UAV as indicated by the data including the wireless signal strength.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
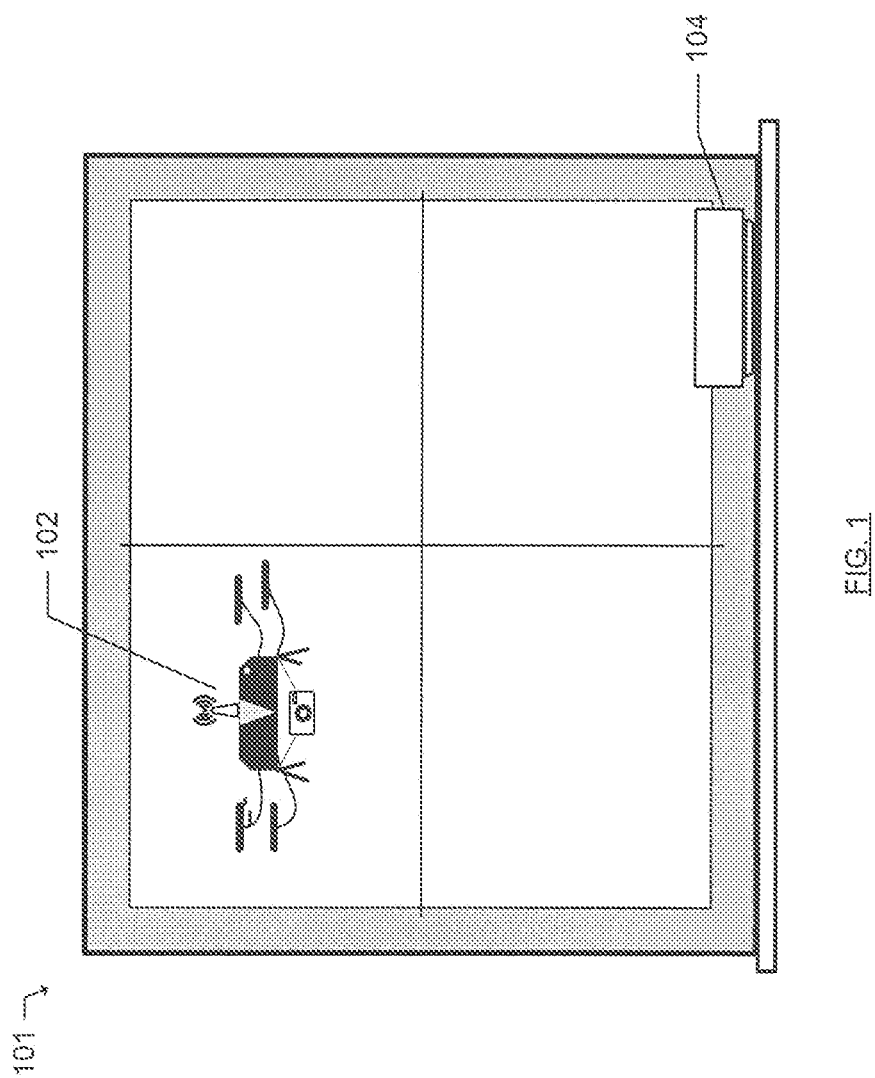
Figure 2:
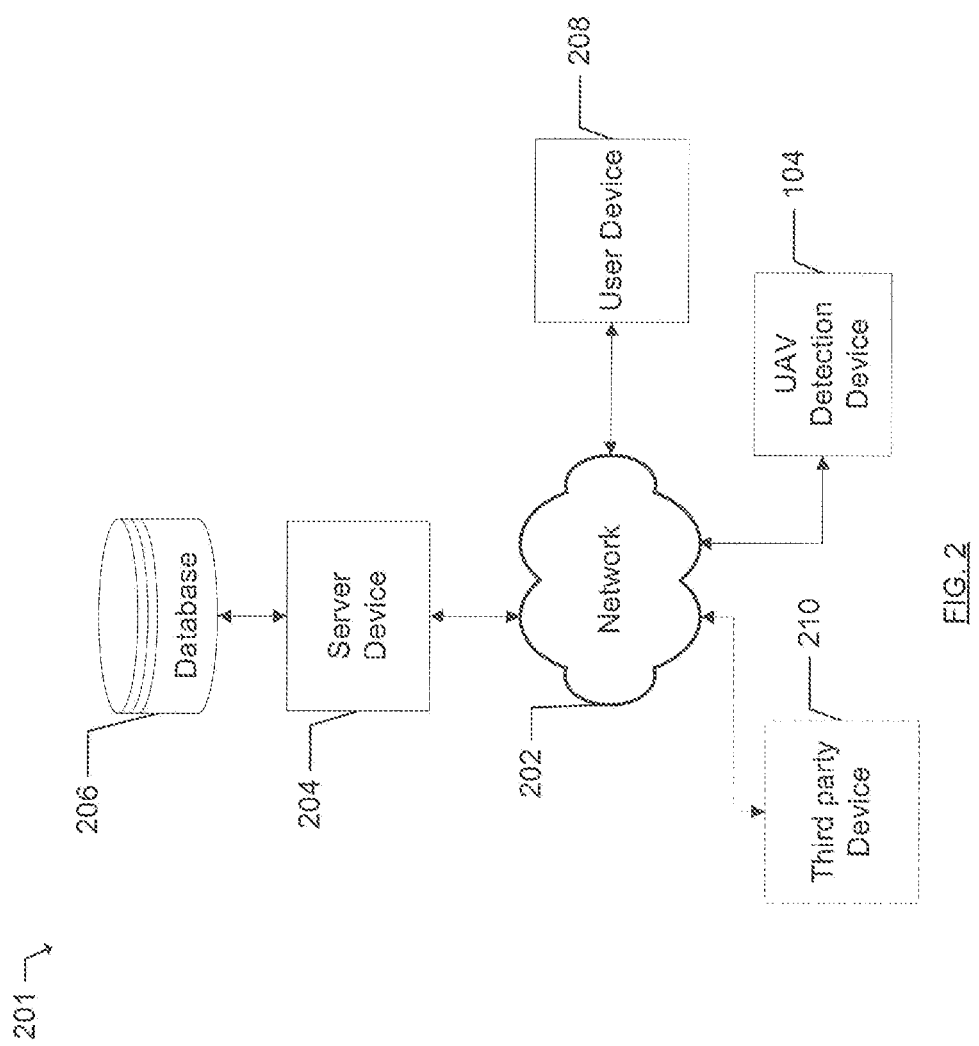
Figure 3:
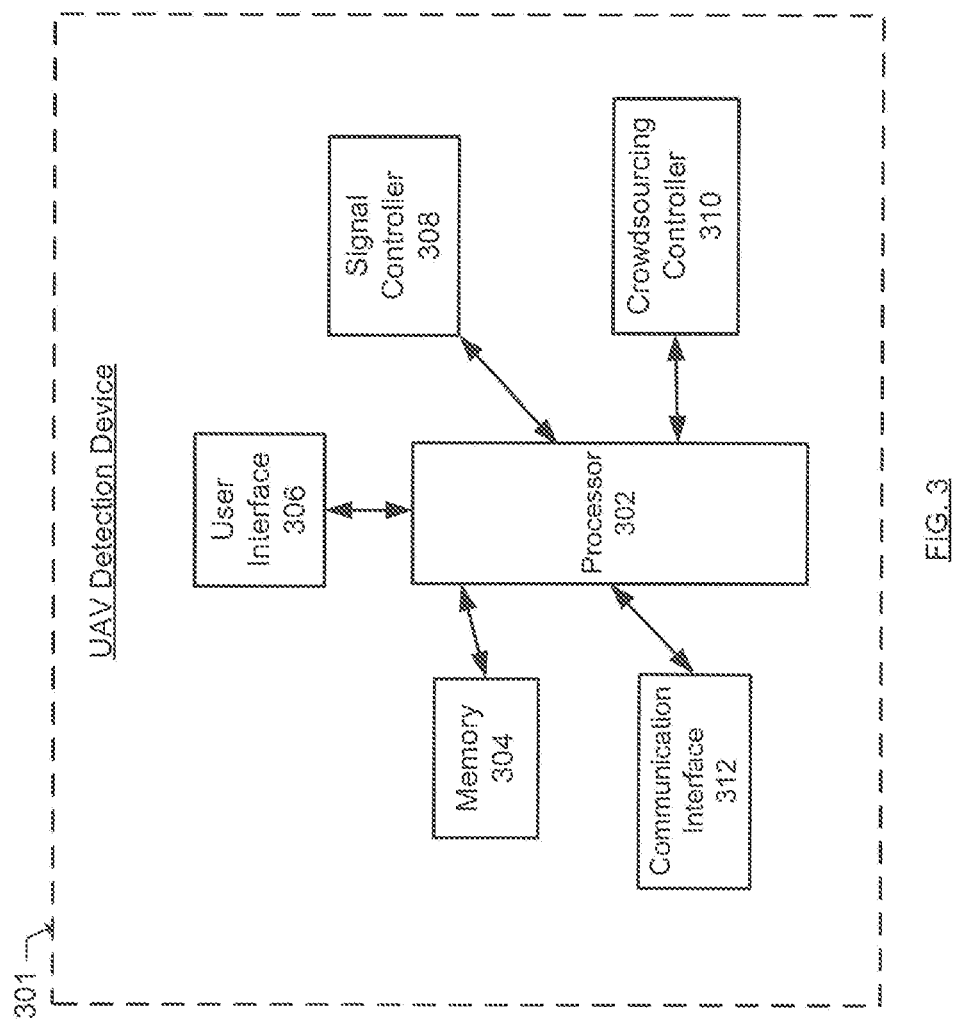
Figure 4:
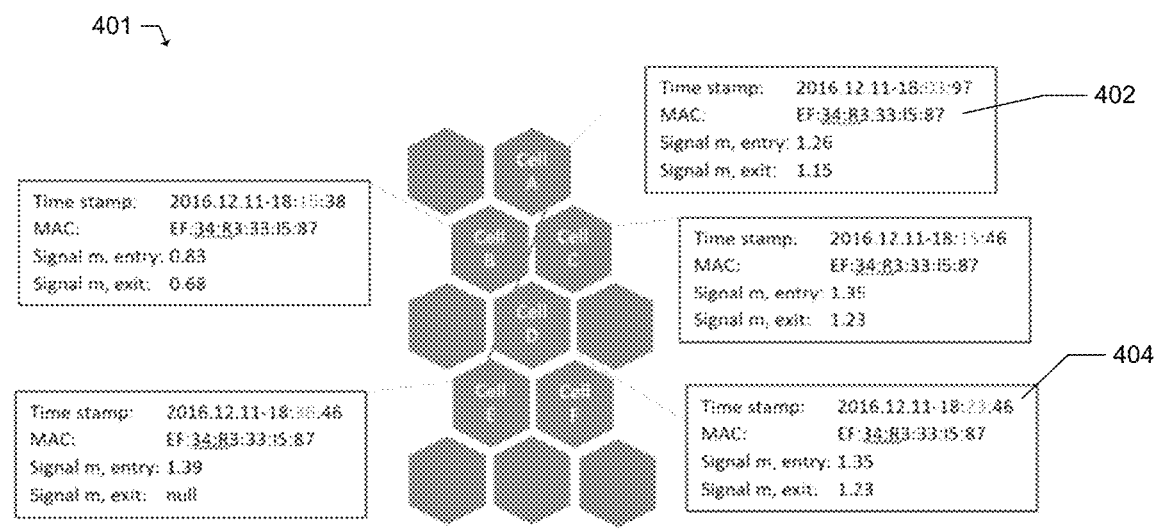
Figure 5A:
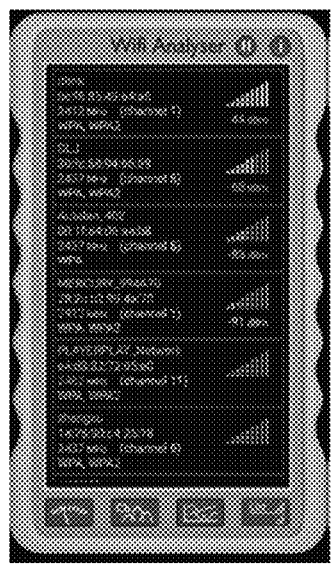
Figure 5B:
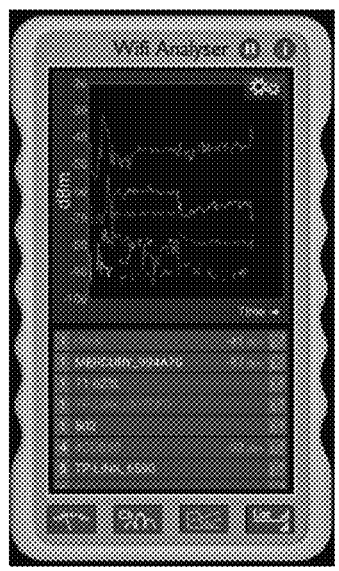
Figure 6:
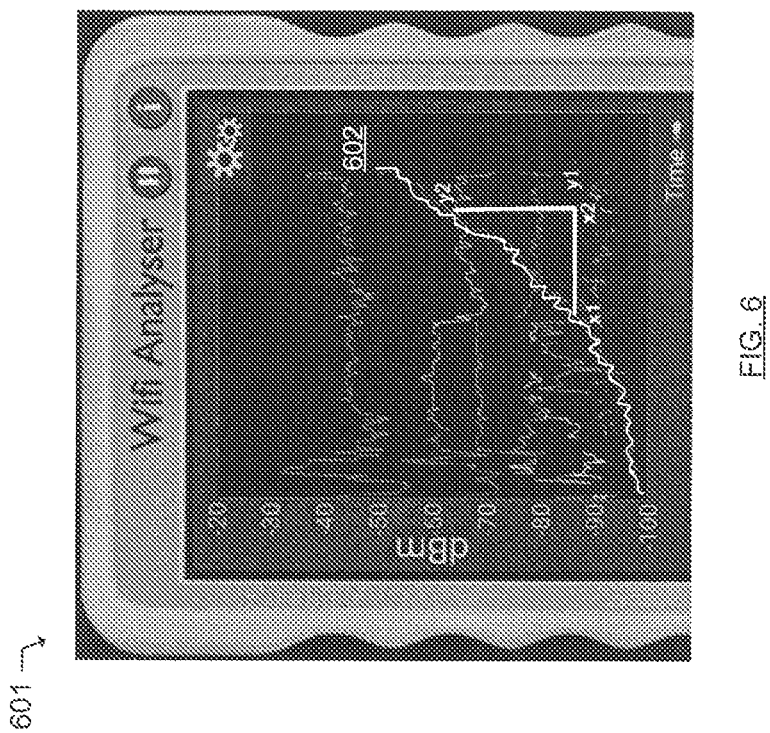
Figure 7:
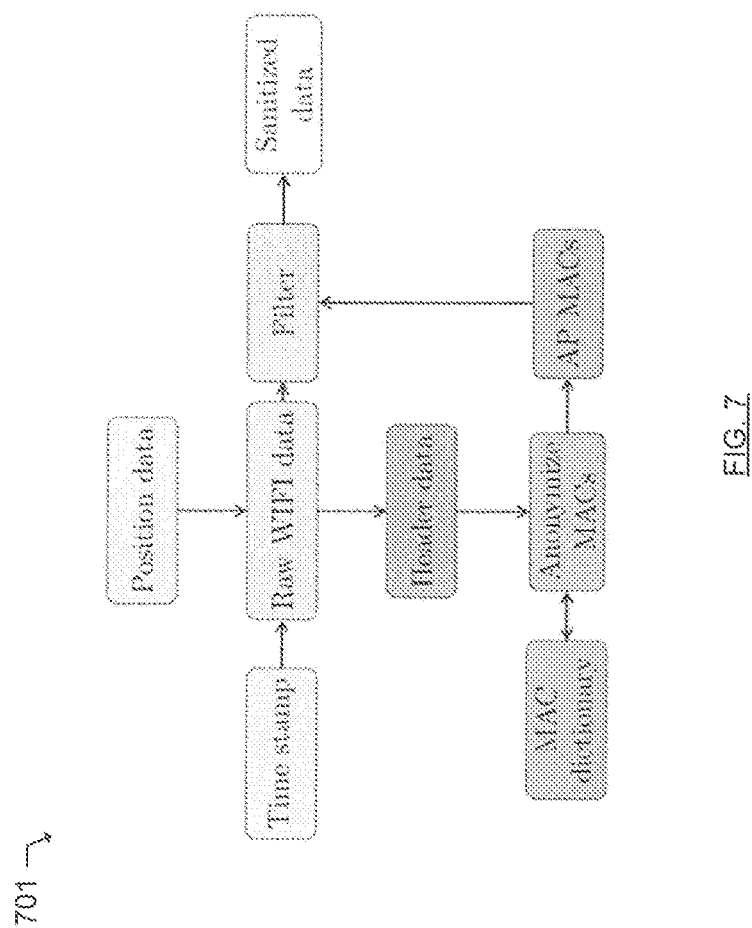
Figure 8:
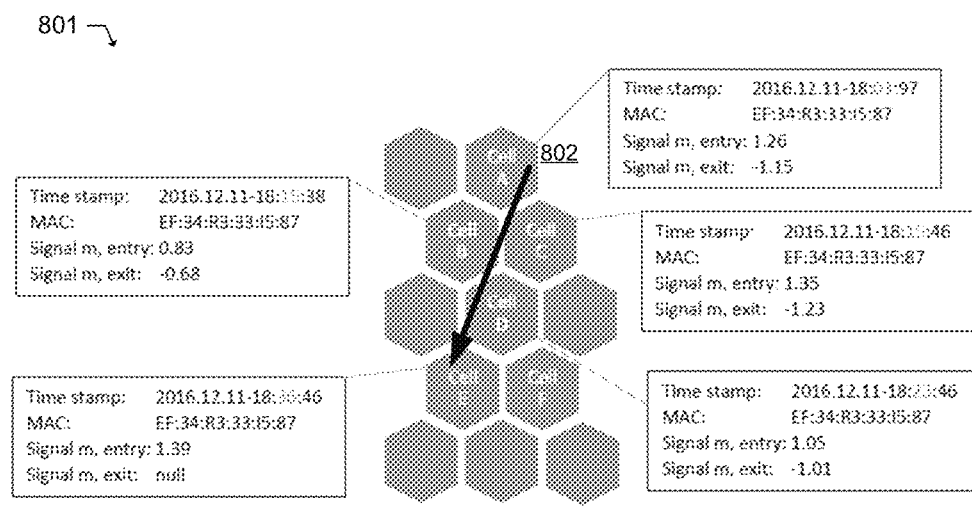
Figure 9:
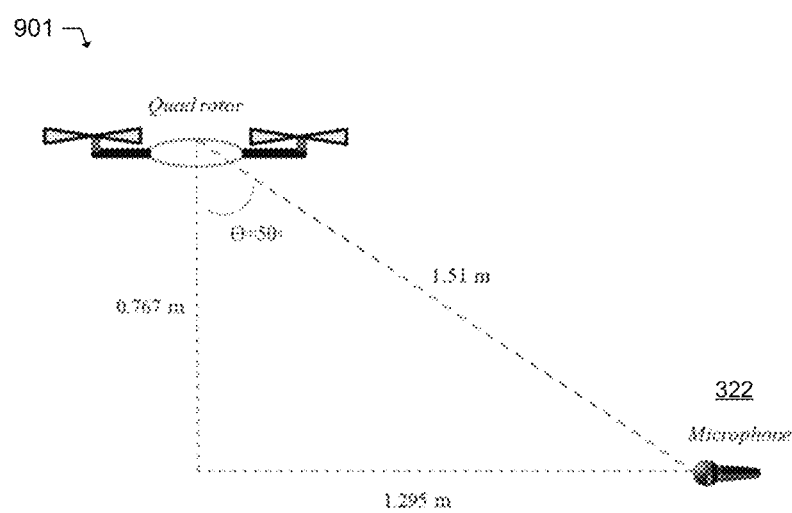
Figure 10:
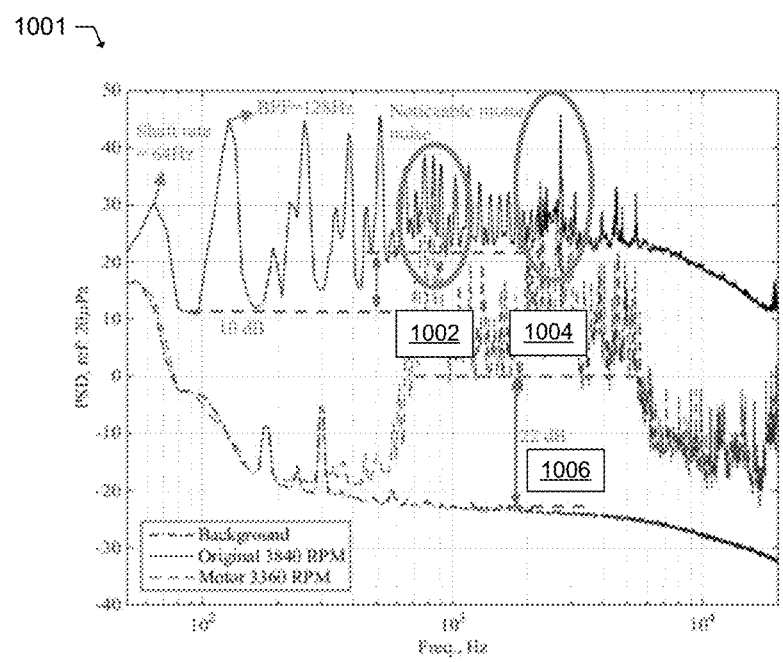
Figure 11:
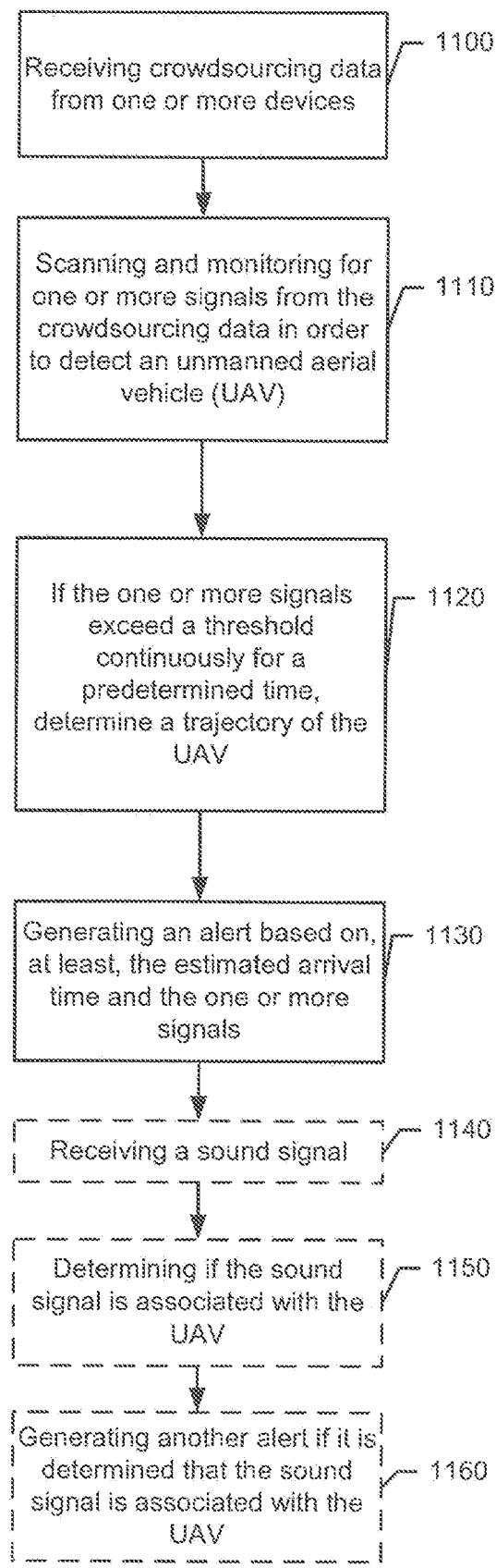

Having thus described certain example embodiments in general terms, reference will hereinafter be made to the accompanying drawings, which are not necessarily drawn to scale, and wherein:

FIG. 1 is an environmental representation of a device that may support an example embodiment of the present invention;

FIG. 2 is a schematic representation of a system that may support an example embodiment of the present invention;

FIG. 3 is a block diagram of an apparatus that may be configured to implement an example embodiment of the present invention;

FIG. 4 is a schematic representation of WiFi radio signal strength captured by devices in various cells in accordance with an example embodiment of the present invention;

FIGS. 5a and 5b are schematic representations of various WiFi sources and the corresponding WiFi signals that may be analyzed in accordance with an example embodiment of the present invention;

FIG. 6 is a schematic representation of a WiFi signal that increases by more than a predefined threshold so as to be potentially indicative of the approach of a UAV in accordance with an example embodiment of the present invention;

FIG. 7 is a block diagram illustrating the provision and filtering of data that may support an example embodiment of the present invention;

FIG. 8 is a schematic representation of WiFi radio signal strength captured by other devices in other cells in accordance with an example embodiment of the present invention;

FIG. 9 is a schematic representation of the capture of noise signal strength in accordance with an example embodiment of the present invention;

FIG. 10 is a line graph representation of power spectral density of a motor and propeller of a UAV in accordance with an example embodiment of the present invention; and FIG. 11 is a flowchart illustrating example operations for detecting a UAV performed by an apparatus in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. The terms "UAV," "drone," "UAS," "unmanned aircraft," "aerial vehicle," and similar terms may be used interchangeably to refer to an aerial vehicle without a human pilot aboard. Thus, use of any such terms should not be taken to limit the spirit and scope of embodiments of the present invention. The term alert may be construed to comprise any form of an alert including a visual alert that is configured to be displayable in a user interface, an audible alert that is configured to produce sound, a haptic or tactile alert or the like. As such the terms alert, alarm or notification may be used interchangeably herein. The terms "noise signal," "audio sound signal," "sound signal", "audio signal" and similar terms may be used interchangeably to refer to an audio signal for an audio source.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., one or more volatile or non-volatile memory device), can be differentiated from a "computer-readable transmission medium," which refers to an electromagnetic signal.

A method, apparatus and computer program product are provided in accordance with an example embodiment in order to provide reliable detection of and to generate an alert regarding an incoming unmanned aerial vehicle (UAV).

There are a number of known UAV detection techniques, but may each suffer from various challenges. The challenges associated with audio detection of UAVs may include that most microphones can only pick up sound from a short distance, that sound signatures of a UAV can be easily changed by making propeller modifications or the like. In addition, audio detection can be challenging in urban environments with significant noise pollution. Another technique for UAV detection relies on GPS detection. However, GPS systems provide for one-way communication, which is not easy to detect. The use of radio frequency detection of UAVs may face challenges associated with interference in, for example, the 2.4 GHz portion of the radio spectrum. Video detection is another technique used to detect UAVs, but is expensive and challenging in dark environments. Thermal detection may be unreliable because UAVs do not produce much heat due to their plastic construction. Finally, radio detection, such as radar detection, is heavy, expensive, and may have difficulty in detecting UAVs because UAVs are small, mostly made of plastic, and electric powered. Therefore, there exists a need to provide reliable UAV detection, monitoring, and alerting, both for privacy purpose to permit a user to take measures to protect their privacy following an alert of an approaching UAV and for triggering purposes such as to notify a user of a delivery or other action to be provided by an approaching drone, such as to permit a door or window to be opened to receive an express packages.

FIG. 1 illustrates an environment in which a UAV detection device 104 of an example embodiment is shown placed on a ledge of a window illustrated in 101. Alternatively or additionally, the UAV detection device 104 may be attached to the window or may be placed in other locations. FIG. 1 also illustrates that in some embodiments, a UAV 102 may be hovering near the window.

Reference is now made to FIG. 2 which illustrates the UAV detection device 104 connected to a network 202. A user device 208 is also shown connected to the network 202. FIG. 2 also illustrates that in some embodiments, a third party device 210 may also be connected to the network 202. The UAV detection device 104 and the user device 208 and optionally the third party device 210 may be configured to communicate over any type of network such as a wireless network, a wired network, or the like. In some embodiments, the user device 208 may be a mobile terminal, such as a mobile telephone, personal digital assistant (PDA), pager, laptop computer, tablet computer, or any of numerous other hand held or portable communication devices, computation devices, content generation devices, content consumption devices, motor vehicles, or combinations thereof. Alternatively, the user device 208 may be a fixed computing device, such as a personal computer. In accordance with some embodiments, the UAV detection device 104 and the third party device 210 may each include or be associated with an apparatus 301, such as that shown in FIG. 3 and described below.

As used herein, where the user device 208 and optionally the third party device 210 is described herein to receive data from another computing device or each other, it will be appreciated that the data may be received directly from the other computing device, the user device 208, or the third party device 210, and/or may be received indirectly via one or more intermediary computing devices, such as, for example, a server device 204, relays, routers, network access points, and/or the like. Similarly, where the user device 208 and optionally the third party device 210 is described herein to send data to another computing device or each other, it will be appreciated that the data may be sent directly to the another computing device the user device 208, of the third party device 210, or may be sent to another computing device via one or more intermediary computing devices, such as, for example, a server device 204, relays, routers, network access points, and/or the like.

As shown in FIG. 2, the UAV detection device 104 and user device 208 may communicate with one another (and, optionally, with one or more third party device 210) via network 202. Network 202 may be a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network, a narrowband-Internet of things (NB-IoT), or the like, a General Packet Radio Service (GPRS) network, Wi-Fi, or other type of network.

The system may also include a database 206, such as may be embodied by a server or other memory device. The database 206 may be accessed directly or via the server device 204 as shown in FIG. 2. Contained within database 206 may be addresses, such as media access control (MAC) addresses, and data regarding the signal strength, e.g., WiFi signal strength of each detected wireless access point (WAP) together with corresponding position data for each WAP, user information associated with individuals who have registered to use the devices described herein, network address information for the devices described herein, and metadata relating to both the user and to the devices. This metadata may contain network capability information (e.g., types of networks that may be utilized to establish a connection with particular devices), communication capabilities information (e.g., languages spoken by the individuals associated with particular user accounts), etc. The metadata may further specify modes of alert communications preferred by particular users, which may include audible alert communications, text alert communications or any other type of alert or combinations thereof.

Referring now to FIG. 3, an apparatus 301 is illustrated that may be embodied by UAV detection device 104 and/or third party device 210. Apparatus 301 includes or is otherwise associated or in communication with constituent components including, but not necessarily limited to, a processor 302, a communication interface 312, a memory 304, a signal controller 308, a crowdsourcing controller 310, and a user interface 306. In some embodiments, the processor 302 (and/or co-processors or any other processing circuitry assisting or otherwise associated with the processor 302) may be in communication with memory 304. The memory 304 may include, for example, one or more volatile and/or non-volatile memories. In other words, for example, the memory 304 may be an electronic storage device (e.g., a computer readable storage medium) comprising gates configured to store data (e.g., bits) that may be retrievable by a machine (e.g., a computing device like the processor 302). The memory 304 may be configured to store information, data, content, applications, instructions, or the like, for enabling the apparatus to carry out various functions in accordance with an example embodiment of the present invention. For example, the memory 304 could be configured to buffer input data for processing by the processor 302. Additionally or alternatively, the memory 304 could be configured to store instructions for execution by the processor 302.

The apparatus 301 may, in some embodiments, be embodied as a chip or chip set. In other words, the apparatus 301 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 301 may therefore, in some cases, be configured to implement an embodiment of the present invention on a single chip or as a single "system on a chip." As such, in some cases, a chip or chipset may constitute means for performing one or more operations for providing the functionalities described herein.

The processor 302 may be embodied in a number of different ways. For example, the processor 302 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally or alternatively, the processor 302 may include one or more processors configured in tandem via a bus to enable independent execution of instructions, pipelining and/or multithreading.

The processor 302 may be configured to execute instructions stored in the memory 304 or otherwise accessible to the processor 302. Alternatively or additionally, the processor 302 may be configured to execute hard coded functionality. As such, whether configured by hardware or software methods, or by a combination thereof, the processor 302 may represent an entity (e.g., physically embodied in circuitry) capable of performing operations described herein, and thus may be physically configured accordingly. Thus, for example, when the processor 302 is embodied as an ASIC, FPGA or the like, the processor 302 may include specifically configured hardware for conducting the operations described herein. Alternatively, as another example, when the processor 302 is embodied as an executor of software instructions, the instructions may specifically configure the processor 302 to perform the algorithms and/or operations described herein when the instructions are executed. For instance, when the processor 302 is a processor of a specific device configured to embody one of the devices contemplated herein (e.g., UAV detection device 104, user device 208, server device 204, or a third party device 210) that configuration of the processor 302 occurs by instructions for performing the algorithms and/or operations described herein. The processor 302 may include, among other things, a clock, an arithmetic logic unit (ALU) and logic gates configured to support operation of the processor 302.

Meanwhile, the communication interface 312 may be any means such as a device or circuitry embodied in either hardware or a combination of hardware and software that is configured to receive and/or transmit data from/to a network, such as network 202, and/or any other device or module in communication with the apparatus 301, including, for example, the third party devices 210. In this regard, the communication interface 312 may include, for example, an antenna (or multiple antennas) and supporting hardware and/or software for enabling communications with a wireless communication network. Additionally or alternatively, the communication interface 212 may include the circuitry for interacting with the antenna(s) to cause transmission of signals via the antenna(s) or to handle receipt of signals received via the antenna(s). In some environments, the communication interface 312 may alternatively or also support wired communication. As such, for example, the communication interface 312 may include a communication modem and/or other hardware/software for supporting communication via cable, digital subscriber line (DSL), universal serial bus (USB) or other mechanisms. For instance, the communication interface 312 may be embodied by an antenna, transmitter 316, receiver 314, or the like.

In some embodiments, such as instances in which the apparatus 301 is embodied by devices 104, 208, or 210, the apparatus 301 may include a user interface 306 that may, in turn, be in communication with the processor 302 to receive an indication of a user input and/or to cause provision of an audible, visual, mechanical or other output to the user. As such, the user interface 306 may include, for example, a keyboard, a mouse, a joystick, a display, a touch screen(s), touch areas, soft keys, a microphone, a speaker, or other input/output mechanisms including haptic or tactile mechanisms. Alternatively or additionally, the processor 302 may comprise user interface circuitry configured to control at least some functions of one or more user interface elements such as, for example, a speaker, ringer, microphone, display, and/or the like. The processor 302 and/or user interface circuitry comprising the processor 302 may be configured to control one or more functions of one or more user interface elements through computer program instructions (e.g., software and/or firmware) stored on a memory accessible to the processor 302 (e.g., memory 304, and/or the like).

The apparatus 301 may also include signal controller 308 and crowdsourcing controller 310 which may be embodied by processor 302 or may be discrete controllers embodied by a processor 302 or the like. As described below, the signal controller 308 may be configured to analyze the wireless signals, e.g., WiFi signals, including the signal strength of the UAV radio signals. As also described below, the crowdsourcing controller 310 may be configured to receive and analyze signals from third party devices 201, the server device 204 or the database 206 relating to wireless signals, e.g., WiFi signals, detected in other cells, such as by the third party devices.

The operations facilitating use of the UAV detection device 104 will now be described. In some example embodiments, the UAV detection device 104 may use the control signals, such as the WiFi radio signals, via which communication is established between a UAV and a remote control device that directs the UAV to estimate whether a UAV associated with the remote control is in physical proximity of the detection device. One primary context in which the approach of a UAV may be detected is in the instance when the WiFi signal strength of the UAV 102 exhibits a changing pattern with a notable change in average value over time since most other WiFi signals in the environment generally have a consistent average value. In some embodiments, the WiFi signal strength of the UAV 102 may be indicative of the distance between the UAV 102 and the UAV.

In some example embodiments, the control signals exchanged with the UAV carry identifying data including a MAC address that provides a unique identity for the UAV. As shown in FIG. 4, the MAC address 402 associated with a UAV remains constant as the UAV traverses through different cells at different points of time as exemplified by the respective time stamps. The cells may be defined as the region proximate a UAV detection device 104 or a third party device 210 within which the device can reliably detect signals, e.g., WiFi signals to/from a UAV. For example, each UAV detection device 104 or third party device 210 may be dispersed within a different apartment property within an apartment complex although the cells may be differently defined in other embodiments.

In some embodiments, the signal controller 308, the processor 302 or the like is configured to capture and analyze a UAV's WiFi signal strength to determine a changing pattern of increasing signal strength which may be indicative of the UAV being in physical proximity to the UAV detection device 104. In this regard, the signal controller 308, the processor 302 or the like is configured to capture the WiFi signal strength of the UAV as well as the signal strength of other WiFi sources. In some embodiments, the apparatus 301, such as the processor 302, the signal controller 308 or the like, may present via user interface 306, a display 501a and 501b which visually presents the signal strength of different WiFi sources as shown in FIG. 5a and the WiFi signal strength patterns for different WiFi sources as shown in FIG. 5b. As shown in the display 501b of FIG. 5b, the signal strength of each source may vary over time. However, the average signal strength over time for all the sources is generally flat or constant.

FIG. 6 shows an example of a screen in which the signal strength 602 of a WiFi source is increasing relatively rapidly which may indicate (as a result of the motion of the WiFi source represented by the increasing signal strength) that the WiFi source is a UAV 102 that is getting closer. In some embodiments, the signal controller 308, the processor 302 or the like is further configured to monitor a value m of the signal representative of the change in signal strength (such as measured in dBm) over time. For example, the signal controller 308, the processor 302 or the like is configured in one embodiment to determine the m value by:

$$m = \frac{\Delta y}{\Delta x} = \frac{y2 - y1}{x2 - x1}$$

where the amount of change in variable y (such as signal strength in y dBm) is divided by the amount of change in x (such as time t).

In some example embodiments, when the m value exceeds a predetermined threshold such as by exceeding the predetermined threshold continuously for a predetermined time, for example, m>1.26 continuously by over a timeframe of 3 seconds, the signal controller, the processor 302 or the like is further configured to trigger execution of one or more processes to parse, clean, and filter the WiFi signals so as to better distinguish WiFi signals associated with a respective UAV, such as an approaching UAV from WiFi signals from other sources. This filtering is beneficial in that it reduces or prevents false alerts. As described below, some embodiments of filtering make use of information from the third party device(s) 201 obtained in a crowdsourced manner. In some example embodiments, the UAV detection device 104 and one or more third party devices 210 are configured to communicate over the network 202. It will be understood that although the UAV detection device 104 and one or more third party devices 210 are configured to communicate over the network 202, the UAV detection device 104 and one or more third party devices 210 may additionally or alternatively be configured to communicate with each other in a mesh network. In some embodiments, the UAV detection device 104 and the third party device 210 and data from the devices is used in a crowdsourced manner.

As depicted in FIG. 7, the system 701 of an example embodiment maintains a media access control (MAC) dictionary, such as in database 206. In some embodiments, the MAC dictionary comprises a list of known MAC addresses in order to be able to discriminate the known MAC addresses from the unknown MAC addresses of a device that is approaching and is presumed to be a UAV about which the user is to be alerted. Additionally, position data and time stamp data from the UAV detection device 104 and/or the one or more third party devices 102 may be combined as raw WiFi data and utilized in filtering the WiFi signals. In one embodiment, the UAV detection device 104, such as the processor 302, is configured to provide header data, including the MAC addresses, from the raw Wi-Fi data. In the cases in which the MAC addresses from the raw WiFi data are anonymized such as to preserve the identity of the original MAC address, the UAV detection device 104, such as the processor 302, is configured to translate the anonymized MAC addresses to wireless access point addresses, such as the addresses of the wireless routers, associated with the original MAC address in order to monitor the original MAC address even though it is anonymized. Thereafter, the MAC addresses from the raw WiFi data (following translation of anonymized MAC addresses) are compared to the known MAC addresses in the MAC dictionary. The WiFi data associated with the MAC addresses that are determined to be known access points (but not UAVs) may then be filtered out to create the sanitized data. In some example embodiments, the UAV detection device 104, such as the processor 302, is configured to perform the comparison iteratively so as to repeat the parsing, cleaning, and filtering of the data. The sanitized data that results comprises only or at least a greater percentage of the WiFi signals that are associated with unknown UAVs.

Because database 206 stores detailed information associated with the UAV detection device 104 and the one or more third party devices 210, the UAV detection device 104, such as the crowdsourcing controller 301, may receive via network 202 crowdsourcing data from the database regarding the wireless signals detected by one or more third party devices 102 when the UAV detection device 104 joins the network 202. After having joined the network, the UAV detection device 104, such as the crowdsourcing controller 310, may also be configured to continue to receive crowdsourcing data regarding the wireless signals detected more recently by one or more third party devices 102. Alternatively or additionally, the UAV detection device 104 may report detected WiFi addresses and signal strength via the network to third party devices 210, the server device 204, the database 206, etc. In this embodiment, crowdsourcing data may be analyzed, such as by the processor 302, the crowdsourcing controller 310 or the like, to identify patterns in the flight behavior route of a UAV such as described above for a UAV crossing multiple cells, provide more accurate determination of the positioning of the UAV relative to the location of the UAV detection device 104 and the one or more third party devices 102 based on WiFi signal from the UAV detected by and separately processed by various third party devices 210, and provide for alerts from a longer distance as a result of this crowdsourcing data. Since the third party devices 210 can detect the UAV before the UAV detection device can detect the UAV with the alert then being determined based on the trajectory of the UAV, that is, based on whether the UAV is heading for the UAV detection device 104.

In this regard, the crowdsourcing controller 310, the processor 310 or the like is configured to determine the trajectory of a UAV and/or the rate of travel of a UAV based upon the readings of the UAV WiFi signals captured by the third party devices 210. Based upon the relative locations of the third party devices and the time stamps associated with the readings captured by the third party devices, the rate of travel, e.g., distance traveled divided by time expended, may be determined. Also, based upon the relative locations of the third party devices and the order in which the UAV WiFi signals are captured by the third party devices as evidenced by the time stamps, the direction of travel, that is, the trajectory, may be determined. In some embodiments, the UAV detection device 104, such as the processor 302 is configured to calculate an estimated arrival time of the UAV traversing across cells based upon the distance between the UAV detecting device 104 and the most recent third party device to detect the UAV WiFi signals and the rate of travel FIG. 8 shows an example representation of WiFi radio signal strength captured by the crowdsourcing network and, in particular, by the third party devices 210. Each reading captured by a third party device 210 of this example embodiment includes a timestamp, an address, e.g., a MAC address, and a measure of the WiFi radio signal strength represented in this example by the signal m entry value and signal m exit value. In some example embodiments, the UAV detection device 104 is configured to receive data from the server device 204 related to position information of the one or more third party devices 102, thereby defining the respective cells. This position information may then be associated with the WiFi radio signal strength readings captured by a respective third party device 210. The UAV detection device 104 of this embodiment is also configured to receive readings captured by the third party devices 210. To do this, the network server device 204 may query database 206 to gather data regarding the detected signals and relative position data of the one or more third party devices 102 which may have detected WiFi signals from the same WiFi source as illustrated in an example representation in FIG. 8. The data of FIG. 8 may additionally be filtered as described above by the UAV detection device 104, and the MAC address 402 may be determined to be associated with a UAV (thereby indicating that the WiFi signals were transmitted by or to the UAV) or to be unknown, that is, not associated with a known WiFi source and, therefore potentially relating to a UAV. FIG. 8 also shows the flight route 802 of the UAV as it traverses through different cells at different points of time as exemplified by the respective time stamps.

FIG. 8 shows the UAV flight route 802 starting from cell A and continuing to cell E. In this example, each cell is representative of the region in which a third party device 210 is able to reliably detect a UAV. In some example embodiments, the one or more third party devices may be associated with a geographically localized community of apartments, although many other arrangements are possible. As shown in FIG. 8, the UAV's flight path from cell A to cell E also goes through cells B, C, and D based on a sequence of increasing time stamps and a common MAC address associated with the UAV. In this embodiment, the one or third party devices 210 associated with the cells A-D would have already reported the detection of wireless signals, such as the WiFi radio signals via which communication is established between a UAV and its remote control device, the MAC address associated with the UAV, the WiFi radio signal strength value m of the remote control associated with the UAV, and timestamps associated with the WiFi radio signal strength to server device 204 via the network. In some embodiments, the one or more third party devices 210 and the data reported is used in a crowdsourced manner. The crowdsourcing controller 310, the processor 302 or the like is configured to obtain and determine based on the crowdsourced data from the one or more third party devices 210 that for MAC address EF:34:R3:33:I5:87, the WiFi signal value m is increasing in a relatively fast rate that exceeds a predetermined threshold and the trajectory of the UAV extends into cell E, thereby triggering the server device 204 to notify the UAV detection device 104 associated with cell E that the UAV's flight route indicates that it may traverse through cell E. In this embodiment, once the UAV detection device 104 is notified, the crowdsourcing controller 310, the processor 302 or the like is configured to use the MAC address that has been identified to monitor for WiFi radio signal strength of the remote control associated with the MAC address of the UAV. Additionally, the UAV detection device using the timestamp data acquired from the crowdsourcing data and the corresponding rate of travel is configured to, with the processor 302, to calculate an estimated arrival time of the UAV.

Upon detecting the approach of a UAV, such as based upon the analysis of the time change of signal strength of the signals captured by the UAV detection device and/or based upon an analysis of the crowdsourced data indicative of an approaching UAV, an alert may be generated. The alert may be of any of several different types. In some example embodiments, a speaker or a speaker assembly of the apparatus 301 may be configured to generate an audible alert that is sounded by an alarm. Additionally or alternatively, it may be preferable for a user of the apparatus 301 to distinguish alarm sounds based on the distance of the UAV to the apparatus 301. In such a situation, the speaker or speaker assembly of the apparatus 301 may be configured to sound different alert types. For example, one alert type may be beep tones indicating the UAV is at a particular distance away (e.g. 100 meters) Additionally or alternatively, the communication interface 312 may be configured to generate a text alert, text message alert, SMS (short message service) alert, notification or the like to be sent to the user device 208. This may be advantageous in such situations when the user cannot hear or is not within range to hear the audible alert.

The approach of the UAV and the resulting alert may be defined or supplemented in some embodiments based upon the detection and analysis of audible signals generated by the UAV. In this regard, the apparatus may be configured to additionally detect and alert the user when the UAV is in very close proximity, for example, hovering near a window as depicted in FIG. 1. As described above, since the UAV detection device 104 has already determined that the UAV is close, perhaps within around 100 meters, based upon an analysis of the time change of WiFi radio signal strength, the microphone 304 of the apparatus 301 may be configured to monitor for and detect a broad spectrum of motor and propeller sounds that may be generated by UAVs. For example, FIG. 9 shows microphone 322 configured to detect noise from a quad-rotor UAV from 1.51 meters.

Reference is now made to FIG. 10, where differences in frequency domain (spectral) representations of an original 9450 propeller, background noise, and an unloaded UAV motor running at nominal motor rotational speeds of 3840 revolutions per minute (rpm) are used to identify, for example, that a UAV is hovering near a window. Noticeable motor noise 1002 and 1004 is captured by the microphone 322 and monitored by the signal controller 308, the processor 302 or the like. In some example embodiments, the signal controller 308, the processor 302 or the like is configured to analyze and determine, for example, that there is a predefined increase in the signal strength of noise within a predetermined frequency range, such as an increase of at least 22 decibels (dB) 1006, and conclude that the UAV is hovering near the window. By determining the closer proximity of the UAV based upon a change in the signal strength of noise, a UAV may be reliably detected without having to consider the noise signature, which may be altered to mask the approach of the UAV. However, noise signature and noise strength may be used in collaboration to determine that it is indeed a UAV hovering near the window. In such embodiment, the signal controller 308, the processor 302 may be configured to query the database 206 for known sounds signatures for UAVs in order to compare received sound signatures with the sounds signatures in the database 206 in order to more accurately identify the UAV that has been detected based on signal strength.

Alternatively or additionally, the UAV detection device 104 may be configured to execute the described detection processes in a hierarchal fashion according to the estimated distance of the UAV to the UAV detection device 104. For example, at long distances, the UAV detection device 104 may be configured to use crowdsourcing data. Based on the crowdsourcing data, the UAV detection device 104 may be configured to calculate an estimated time of arrival of the UAV to the location of the detection device 104 and to cause a first alert to be generated in advice of the estimated time of arrival. Alternatively or additionally, the server device 204 may be configured to alert the detection device 104 of the approaching UAV based on its analysis of the crowdsourced data. In some embodiments, the UAV detection device 104 is configured to detect a UAV at mid distance range based on the strength of the WiFi signals that are captured and analyzed by the UAV detection device 104 and a second alert may then be generated. At a closer range, the UAV detection device 104 is configured to analyze noise signals and WiFi signals to determine that the device is within a few meters of the UAV detection device 104 based on noise signal strength and to then generate a third alert. Thus, an example embodiment provides for multiple levels of alerting with the UAV at different distances from the UAV detection device with a longer range alert provided based on an analysis of crowdsourced data, an intermediate alert provided based upon the capture and analysis of the signal strength of the UAV WiFi signals by the UAV detection device and a closer alert provided based upon the capture and analysis of noise signal strength values.

Turning now to FIG. 11, a flowchart illustrates an example method that may be performed by the UAV detection device 104. In this regard, the UAV detection device 104 may be embodied by an apparatus 301, such as shown in FIG. 3 (and as described in greater detail in conjunction with FIG. 3). The apparatus 301 may include means, such as a processor 302, memory 304, and/or communication interface 312 for executing the operations described in connection with FIG. 11.

In block 1100, the apparatus 301 includes means, such as crowdsourcing controller 310 and/or processor 302, configured to receive crowdsourcing data from one or more devices. The crowdsourcing data comprises detected control signals, such as the WiFi radio signals relating to communication is established between a UAV and its remote control device. The WiFi radio signals may include an address, such as the MAC address, associated with the UAV. Based upon the WiFi signals, the processor is configured to determine the WiFi radio signal strength, such as a WiFi radio signal strength value m of the signals communicated between the UAV and its remote control device, and a timestamp associated with the WiFi radio signals.

In block 1110, apparatus 301 includes means, such as the signal controller 308 and/or processor 302, configured to scan and monitor for one or more WiFi signals from a WiFi source, such as a UAV, identified from the crowdsourcing data in order to more accurately detect a UAV. Alternatively or additionally, the apparatus 301 may include means, such as signal controller 308 and/or processor 302, configured to capture and analyze WiFi signals, either to supplement the analysis of the crowdsourcing data or instead of or as an alternative to the crowdsourcing data.

In block 1120, the apparatus 301 includes means, such as signal controller 308 and/or processor 302, configured to analyze the crowdsourcing data to generate data comprising a trajectory of the UAV and, in some embodiments, an estimated arrival time of the UAV at the UAV detection device 104 in an instance in which the one or more signals satisfy a threshold, such as by continuously exceeding a threshold for a predetermined time. In this embodiment, the processor 302 may also be configured to calculate an estimated arrival time of the UAV traversing across neighboring cells based upon, for example, the rate of travel of the UAV and the current or most recent location of the UAV. In some example embodiments, the trajectory of the UAV is also determined in order to identify whether the UAV will approach the UAV detection device 104 or will fly in a different direction.

In block 1130, the apparatus 301 includes means, such as processor 302, configured to generate an alert based on, at least, the estimated arrival time and the one or more WiFi signals. In some embodiments the estimated arrival time may predict when the UAV is in physical proximity to the UAV detection device 104. In some embodiments, the processor 202 may be configured to generate an alert in advance, such as a predetermined time in advance, of the UAV arrival to inform a user that he or she should expect the UAV device.

In some embodiments, the approach of the UAV may be refined and, as shown in block 1140, the apparatus 301 may include means, such as processor 302 and/or the user interface 306, configured to receive a sound signal, such as the noise signal strength. In block 1150, the apparatus 301 of this example embodiment includes means, such as processor 202, configured to determine if the sound signal is associated with the UAV. In some example embodiments the determination is based on the noise strength and optionally noise signature of the received sound signal. For example, a determination may be made as to whether the noise strength satisfies a predefined threshold indicative of the closer approach of the UAV.

In block 1160, apparatus 301 of this example embodiment includes means, such as the processor 302, configured to generate another alert if it is determined that the noise strength is associated with the UAV and satisfies the predefined threshold indicative of the closer approach of the UAV. The alert may comprise any form of an alert including a visual alert that is configured to be sent and displayable on a user interface of user device 208, an audible alert that is configured to produce sound, a haptic or tactile alert or the like.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. In the example embodiment described herein, the UAV detection device 104 monitors the strength of WiFi signals, however, the signals may be any type of wireless communication signals. Also, MAC addresses are used throughout as an example and the WiFi sources, including the UAVs may be identified by other addressing schemes in other embodiments. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
  receiving data including wireless signal strength collected by one or more devices;
  monitoring the data including the wireless signal strength to determine if the wireless signal strength of a wireless signal source increases over time in a manner to satisfy a predefined threshold in order to be indicative of an unmanned aerial vehicle (UAV);
  determining a trajectory of the UAV based upon the data including the wireless signal strength; and
  generating an alert based on, at least, the trajectory of the UAV as indicated by the data including the wireless signal strength.

2. The method of claim 1, further comprising:
  receiving an audio noise signal;
  determining whether the audio noise signal is associated with the UAV based on signal strength; and
  generating another alert in an instance in which the audio noise signal is associated with the UAV.

3. The method according to claim 2, wherein determining the audio noise signal is associated with the UAV comprises analyzing an audio noise strength of the received audio noise signal and identifying the UAV in an instance in which the audio noise signal satisfies a predetermined threshold.

4. The method according to claim 1, further comprising determining an estimated time of arrival of the UAV based on the data including the wireless signal strength.

5. The method of claim 4 wherein determining the estimated arrival time further comprises calculating the estimated arrival time based upon the trajectory and timestamp information associated with the data collected by one or more devices.

6. The method according to claim 1, further comprising:
  maintaining an address dictionary of address of a plurality of wireless sources; and
  comparing address information from the data collected to the addresses maintained by the address dictionary to facilitate a determination of the UAV.

7. The method according to claim 1, wherein the data includes position data that is based on a position of the one or more devices of a crowdsourcing network.

8. An apparatus comprising at least one processor and at least one memory including computer program code, the at least one memory coupled to the at least one processor, and the computer program code configured to, when executed by a processor, cause the apparatus to:

receive data including wireless signal strength collected by one or more devices;

monitor the data including the wireless signal strength to determine if the wireless signal strength of a wireless signal source increases over time in a manner to satisfy a predefined threshold in order to be indicative of an unmanned aerial vehicle (UAV);

determine a trajectory of the UAV based upon the data including the wireless signal strength; and generate an alert based on, at least, the trajectory of the UAV as indicated by the data including the wireless signal strength.

9. The apparatus of claim 8, wherein the apparatus is further caused to:

receive an audio noise signal;

determine whether the audio noise signal is associated with the UAV based on signal strength; and generate another alert in an instance in which the audio noise signal is associated with the UAV.

10. The apparatus according to claim 9, wherein determining the audio noise signal is associated with the UAV comprises analyzing an audio noise strength of the received audio noise signal and identifying the UAV in an instance in which the audio noise signal satisfies a predetermined threshold.

11. The apparatus according to claim 8, wherein the apparatus is further caused to determine an estimated time of arrival of the UAV based on the data including the wireless signal strength.

12. The apparatus of claim 11 wherein determining the estimated arrival time further comprises calculating the estimated arrival time based upon the trajectory and time-stamp information associated with the data collected by one or more devices.

13. The apparatus according to claim 8, wherein the apparatus is further caused to:

maintain an address dictionary of address of a plurality of wireless sources; and compare address information from the data collected to the addresses maintained by the address dictionary to facilitate a determination of the UAV.

14. The apparatus according to claim 8, wherein the data includes position data that is based on a position of the one or more devices of a crowdsourcing network.

15. A computer program product comprising a non-transitory computer readable storage medium, the non-transitory computer readable storage medium comprising instructions that, when executed by a device, configure the device to:

receive data including wireless signal strength collected by one or more devices;

monitor the data including the wireless signal strength to determine if the wireless signal strength of a wireless signal source increases over time in a manner to satisfy a predefined threshold in order to be indicative of an unmanned aerial vehicle (UAV);

determine a trajectory of the UAV based upon the data including the wireless signal strength; and generate an alert based on, at least, the trajectory of the UAV as indicated by the data including the wireless signal strength.

16. The computer program product of claim 15, wherein the device is further configured to:

receive an audio noise signal;

determine whether the audio noise signal is associated with the UAV based on signal strength; and generate another alert in an instance in which the audio noise signal is associated with the UAV.

17. The computer program product according to claim 16, wherein determining the audio noise signal is associated with the UAV comprises analyzing an audio noise strength of the received noise signal and identifying the UAV in an instance in which the audio noise signal satisfies a predetermined threshold.

18. The computer program product according to claim 15, wherein the device is further configured to determine an estimated time of arrival of the UAV based on the data including the wireless signal strength.

19. The computer program product of claim 18 wherein determining the estimated arrival time further comprises calculating the estimated arrival time based upon the trajectory and timestamp information associated with the data collected by one or more devices.

20. The computer program product according to claim 15, wherein the device is further configured to:

maintain an address dictionary of address of a plurality of wireless sources; and compare address information from the data collected to the addresses maintained by the address dictionary to facilitate a determination of the UAV.

21. The computer program product according to claim 15, wherein the data includes position data that is based on a position of the one or more devices of a crowdsourcing network.

* * * * *